(12) United States Patent
Liu et al.

(10) Patent No.: US 12,235,213 B1
(45) Date of Patent: Feb. 25, 2025

(54) NIGHT HYPER-SPECTRAL REMOTE SENSING IMAGING SYSTEM FOR MULTI-COMPONENT ATMOSPHERIC TRACE CONSTITUENTS

(71) Applicant: UNIVERSITY OF SCIENCE AND TECHNOLOGY OF CHINA, Hefei (CN)

(72) Inventors: Cheng Liu, Hefei (CN); Wanchao Ma, Hefei (CN); Chengzhi Xing, Hefei (CN); Zaiwei Wang, Hefei (CN); Yue Yang, Hefei (CN); Weiheng Wang, Hefei (CN)

(73) Assignee: UNIVERSITY OF SCIENCE AND TECHNOLOGY OF CHINA, Hefei (CN)

( * ) Notice: Subject to any disclaimer, the term of this patent is extended or adjusted under 35 U.S.C. 154(b) by 0 days.

(21) Appl. No.: 18/766,527

(22) Filed: Jul. 8, 2024

(30) Foreign Application Priority Data

Sep. 28, 2023 (CN) .......................... 202311267942.1

(51) Int. Cl.
| | |
|---|---|
| *G01N 21/3504* | (2014.01) |
| *G01J 3/28* | (2006.01) |
| *G01N 21/17* | (2006.01) |

(52) U.S. Cl.
CPC ........ *G01N 21/3504* (2013.01); *G01J 3/2823* (2013.01); *G01J 2003/282* (2013.01);
(Continued)

(58) Field of Classification Search
CPC ....... B64U 2101/35; G01N 2201/0214; G01N 2021/1793; G01N 2021/1795;
(Continued)

(56) References Cited

U.S. PATENT DOCUMENTS

| | | | |
|---|---|---|---|
| 10,690,562 B2 * | 6/2020 | Rieker | G01N 33/0027 |
| 10,955,294 B2 * | 3/2021 | Podmore | G01J 3/45 |

(Continued)

FOREIGN PATENT DOCUMENTS

| | | | | |
|---|---|---|---|---|
| WO | WO-2010147465 A2 * | 12/2010 | | G01J 3/02 |
| WO | WO-2021156864 A1 * | 8/2021 | | B64C 39/024 |

OTHER PUBLICATIONS

Dwight, Jason G., et al. "Compact snapshot image mapping spectrometer for unmanned aerial vehicle hyperspectral imaging." Journal of Applied Remote Sensing 12.4 (2018): 044004-044004. (Year: 2018).*

(Continued)

*Primary Examiner* — Jonathan M Hansen
*Assistant Examiner* — Noah J. Haney
(74) *Attorney, Agent, or Firm* — Jiwen Chen; Joywin IP Law PLLC

(57) ABSTRACT

A night hyper-spectral remote sensing imaging system for multi-component atmospheric trace constituents includes a light source unit, a detection light path unit, an unmanned aerial vehicle tracking light path unit, and a control and processing unit, where the light source unit couples and outputs first light source light with different wavelength ranges capable of imaging at night; the detection light path unit collimates and outputs the first light source light, and receive remote sensing light fed back based on the first light source light; the unmanned aerial vehicle tracking light path unit tracks and positions an unmanned aerial vehicle based on an unmanned aerial vehicle tracking light path; and the control and processing unit collects an original spectrum of the first light source light and a remote sensing spectrum and perform imaging analysis and process on the multi-component atmospheric trace constituents, and adjust and control the tracking light path.

7 Claims, 7 Drawing Sheets

(52) U.S. Cl.
CPC ............... *G01J 2003/2826* (2013.01); *G01N 2021/1795* (2013.01); *G01N 2201/0214* (2013.01)

(58) Field of Classification Search
CPC ............... G01N 21/3504; G01J 3/2823; G01J 2003/282; G01J 2003/2826; G06T 2207/10036; G06T 2207/10032
USPC .......................................................... 356/326
See application file for complete search history.

(56) References Cited

U.S. PATENT DOCUMENTS

| | | | |
|---|---|---|---|
| 11,994,462 B1* | 5/2024 | Wiemokly | F25B 9/14 |
| 11,999,480 B2* | 6/2024 | Loti | G01C 11/02 |
| 2013/0110400 A1 | 5/2013 | Moshe | |
| 2013/0176570 A1* | 7/2013 | Beck | G01N 21/314 |
| | | | 356/432 |
| 2017/0115218 A1* | 4/2017 | Huang | G01S 7/4802 |
| 2019/0302083 A1* | 10/2019 | Lalovic | G01J 3/0224 |
| 2020/0264047 A1* | 8/2020 | Coward | G01J 3/2823 |
| 2023/0280270 A1* | 9/2023 | Myrick | G01N 33/0027 |
| | | | 356/326 |
| 2023/0366811 A1* | 11/2023 | Swenson | G01J 3/0294 |

OTHER PUBLICATIONS

Li, Xi, et al. "Monitoring hourly night-time light by an unmanned aerial vehicle and its implications to satellite remote sensing." Remote Sensing of Environment 247 (2020): 111942. (Year: 2020).*

* cited by examiner

NIGHT HYPER-SPECTRAL REMOTE SENSING IMAGING SYSTEM FOR MULTI-COMPONENT ATMOSPHERIC TRACE CONSTITUENTS

This application claims priority of Chinese Application No. 2023112679421, filed Sep. 28, 2023, which is hereby incorporated by reference.

FIELD OF TECHNOLOGY

The present invention belongs to the cross technical field of optical measurement and instrument automation, and particularly relates to a night hyper-spectral remote sensing imaging system for multi-component atmospheric trace constituents.

BACKGROUND TECHNOLOGY

Atmospheric physical and chemical processes at night also play an extremely important role in a whole atmospheric system. Significant atmospheric inversion at night will inhibit diffusion and removal of pollution gases, which will aggravate air pollution and the chemical process of a troposphere zone at night, and even affect atmospheric conditions during the next day. Therefore, improving night stereo observation data is helpful to further promote the construction of a whole-time stereo remote sensing monitoring system for an atmospheric environment.

At present, some scholars have used a laser radar to detect the pollution gases at night, but there are some limitations, for example, the cost is high and few gases can be measured (only aerosol and PM2.5). Meanwhile, some scholars adopt point-type sampling instruments to study the concentration of the pollution gases at a certain point in the bottom of the atmosphere, but spatial distribution and transmission of the pollution gases cannot be given. Therefore, it is very important to develop a low-cost, non-contact measurement apparatus that can measure a variety of pollution gases for the above-mentioned research.

Hyper-spectral remote sensing instruments have the advantages of high detection precision, various observation types, all-weather observation and high time resolution, and have been widely used in the detection of a variety of pollution gas constituents. Its measuring principle is based on the Lambert-Beer law, which can be summarized in one sentence: after a beam of parallel light enters a transparent and uniform medium, the intensity of emergent light is an exponential function of a length of a path that the light passes through the medium.

A hyper-spectral remote sensing technology can measure a series of trace gases, such as O3, NO2, BrO, HCHO, SO2, OClO, HONO, CHOCHO, I2, NH3, O4 and NO3. Today, owing to the development of a hardware level, the hyper-spectral remote sensing technology has been developed. However, up to now, there has been the lack of an imaging measuring instrument for night pollution gases based on the principle of the hyper-spectral technology all over the world. Therefore, it is very necessary to develop an imaging measuring instrument for night pollution gases based on the principle of the hyper-spectral remote sensing.

A sub-technology of the principle of the hyper-spectral technology adopts the measurement principle of a long-path hyper-spectral remote sensing instrument for imaging the distribution characteristics of the pollution gases. However, use conditions of an ordinary long-path hyper-spectral remote sensing instrument require that the instrument be stationary, and only one light path in one direction can be observed; and in order to achieve plane imaging of the pollution gases, it is necessary to move the detection light path in a certain spatial range according to the characteristics of geometric optics. Meanwhile, in order to meet the requirement that a measuring device can be automatically calibrated, it is necessary to add a calibration light path and a specific mechanical device and an automatic control system.

Based on the above technical problems, it is necessary to develop a device which can make the measuring beam move freely in a certain range and return effective detection information to the detector, so as to meet the requirements of use in night scenarios, low cost, rapid and non-contact measurement, imaging of pollution gases and the measurement of various types of gases.

SUMMARY OF THE INVENTION

In view of the above, an object of the present invention is to provide a night hyper-spectral remote sensing imaging system for multi-component atmospheric trace constituents, which achieves remote sensing measurement and imaging of pollution gases based on a hyper-spectral algorithm in a large range through an optical structure and a mechanical automatic mechanism.

In order to achieve the purpose of the present invention, an embodiment provides a night hyper-spectral remote sensing imaging system for multi-component atmospheric trace constituents, including a light source unit, a detection light path unit, an unmanned aerial vehicle tracking light path unit, and a control and processing unit, wherein the light source unit is used for coupling and then outputting first light source light of a plurality of first light sources with different wavelength ranges capable of imaging at night;

the detection light path unit is used for collimating and then outputting the first light source light emitted by the light source unit, and receiving remote sensing light fed back based on the first light source light;

the unmanned aerial vehicle tracking light path unit is used for tracking and positioning an unmanned aerial vehicle based on an unmanned aerial vehicle tracking light path; and the control and processing unit is used for collecting an original spectrum of the first light source light and a remote sensing spectrum of the remote sensing light and performing imaging analysis and processing on the multi-component atmospheric trace constituents, and is also used for adjusting and controlling the tracking light path based on tracking and positioning information.

Preferably, the light source unit includes a constant current power supply, the plurality of first light sources with different wavelength ranges, couplers corresponding to the light sources one to one, and a one-into-many optical fiber; and each first light source emits the first light source light based on electric energy provided by the constant current power supply, and the first light source light is coupled to a receiving end of the one-into-many optical fiber through the corresponding coupler, and the first light source light of all the first light sources is transmitted through the one-into-many optical fiber and outputted from an emergent end of the one-into-many optical fiber.

Preferably, the light source unit further includes a temperature control platform, and the temperature control platform performs constant temperature control on the plurality of first light sources with different wavelength ranges in combination with a proportional-integral-derivative (PID) algorithm, so that temperature fluctuation ranges of the first light sources are controlled within +/−0.1° C.

Preferably, the light source unit further includes optical brackets for supporting the couplers, and the couplers adopt quartz globe lenses.

Preferably, the detection light path unit includes an emergent coupling lens, a Semi-transparent and semi-reflective prism, and a collimating telescope subsystem, the first light source light emitted by the light source unit passes through the emergent coupling lens, the Semi-transparent and semi-reflective prism and the collimating telescope subsystem sequentially to be collimated, and a collimated light beam is irradiated on a corner reflector in the unmanned aerial vehicle tracking light path unit to form an emergent light path for gas measurement, wherein the surface precision of the emergent coupling lens is preferably less than a quarter of a wavelength based on 200 nm, and the emergent coupling lens is located at a focus of a first reflector at a distance from the first reflector at an incident end of the collimating telescope subsystem, to determine a position of an emergent end of the one-into-many optical fiber with a purpose of ensuring that an optical fiber emission angle passing through the emergent coupling lens is less than 30°.

Preferably, the detection light path unit further includes an optical fiber clamping and focusing mechanism, and the optical fiber clamping and focusing mechanism is controlled to adjust a distance from an output end of the one-into-many optical fiber to the emergent coupling lens.

Preferably, the unmanned aerial vehicle tracking light path unit includes an unmanned aerial vehicle carrying two second light sources, a reticle, an eyepiece, and a Charge Coupled Device (CCD) detector; and emergent light of the second light sources is received by the collimating telescope subsystem and irradiated on the Semi-transparent and semi-reflective prism, and an included angle between the Semi-transparent and semi-reflective prism and incident light is 45°, after being reflected by the Semi-transparent and semi-reflective prism, the incident light is emitted to the CCD detector through the reticle and the eyepiece, the CCD detector detects positions of two second light source imaging points on the reticle to form the unmanned aerial vehicle tracking light path, the unmanned aerial vehicle tracking light path is coaxial with a detection light path through the Semi-transparent and semi-reflective prism, and the CCD detector generates a deviation correcting signal when the two second light source imaging points move.

Preferably, the unmanned aerial vehicle also carries the corner reflector, emergent light of the detection light path unit, after being transmitted in a measurement area, carries information of the multi-component atmospheric trace constituents and is received and then reflected by the corner reflector, reflected light is received by the collimating telescope subsystem, and then passes through the Semi-transparent and semi-reflective prism, the emergent coupling lens and the output end of the one-into-many optical fiber sequentially to form a collection light path for gas measurement.

Preferably, the control and processing unit includes a first spectrometer, a second spectrometer with processing function, and a rotating platform; and the first spectrometer is used for emitting the original spectrum of the first light source light by adopting the light source unit and transmitting the original spectrum to the second spectrometer, the second spectrometer collects the remote sensing spectrum from the output end of the one-into-many optical fiber in the collection light path, and performs analysis and processing on the multi-component atmospheric trace constituents based on the original spectrum and the remote sensing spectrum, and also acquires the deviation correcting signal from the CCD detector, and controls the rotating platform to drive the collimating telescope subsystem based on the deviation correcting signal and in combination with the PID control algorithm, so that the unmanned aerial vehicle moves to a center of an observation field of view again, and then the detection light path achieves continuous and normal observation.

Preferably, the CCD detector also generates a linear distance variation signal of a linear distance between the unmanned aerial vehicle and the collimating telescope subsystem when the two second light source imaging points move, and the second spectrometer updates a real-time distance between the unmanned aerial vehicle and the collimating telescope subsystem according to the linear distance variation signal.

Compared with the prior art, the present invention at least has the beneficial effects as follows:

By setting the wavelengths of the first light sources in the light source unit and cooperating with the detection light path unit, the unmanned aerial vehicle tracking light path unit and the control and processing unit, the measurement of pollution gases at night is achieved, the measurement is more convenient, and the time and labor are saved; compared with the measurement of environmental pollution gases by a laser radar, more types of pollution gases can be measured, and the cost is lower and the use is more convenient. Compared with an ordinary unmanned aerial vehicle point-type pollution gas measuring instrument, more intuitive three-dimensional spatial distribution information of pollution gases can be given. Compared with an ordinary long-path differential optical absorption spectroscopy (LP-DOAS), application scenarios of pollutant monitoring are significantly broadened, and spatial distribution information of more types of pollution gases in a larger space can be more easily measured with better timeliness.

BRIEF DESCRIPTION OF THE DRAWINGS

In order to more clearly illustrate technical solutions in embodiments of the present invention or in the prior art, the accompanying drawings required to be used in the description of the embodiments or the prior art are introduced briefly as follows. Apparently, the accompanying drawings in the following description are only some embodiments of the present invention, and it will be understood by those ordinarily skilled in the art that other drawings can be obtained according to the accompanying drawings without creative efforts.

DESCRIPTION OF THE EMBODIMENTS

In order to make the purposes, technical solutions and advantages of the present invention more clear, the present invention will be further described in detail with the drawings and embodiments. It should be understood that the specific embodiments described here, while indicating the scope of the present invention, are intended for purposes of illustration only and are not intended to limit the scope of the present invention.

Figure 1:
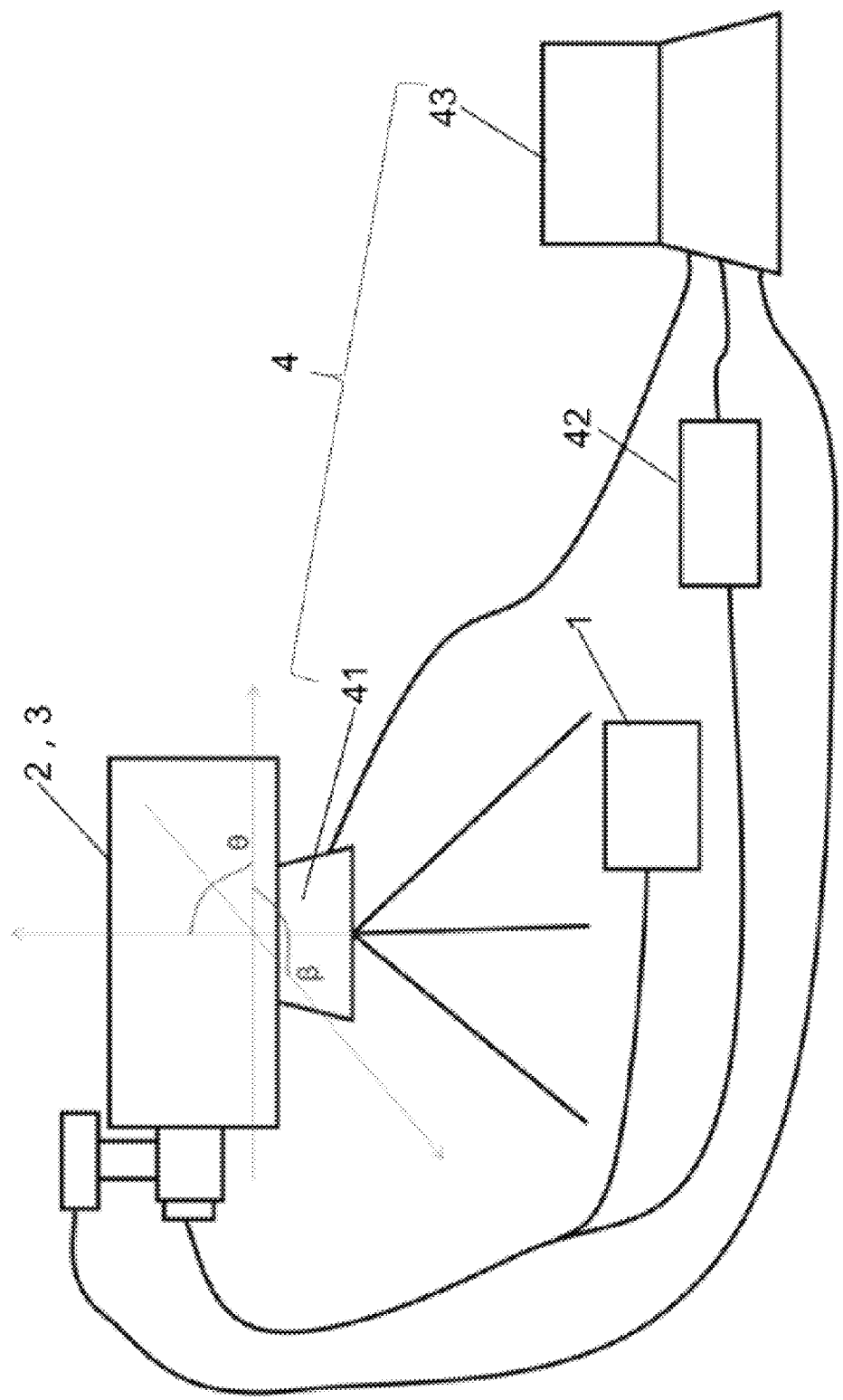
FIG. 1 is a structural schematic diagram of a night hyper-spectral remote sensing imaging system for multi-component atmospheric trace constituents provided by an embodiment.

FIG. 1 is a structural schematic diagram of a night hyper-spectral remote sensing imaging system for multi-component atmospheric trace constituents provided by an embodiment. As shown in FIG. 1, the night hyper-spectral remote sensing imaging system provided by the embodiment includes a light source unit 1, a detection light path unit 2, an unmanned aerial vehicle tracking light path unit 3 and a control and processing unit 4, where the light source unit is used for coupling and then outputting first light source light of a plurality of first light sources with different wavelength ranges capable of imaging at night; the detection light path unit is used for collimating and then outputting the first light source light emitted by the light source unit, and receiving remote sensing light fed back based on the first light source light; the unmanned aerial vehicle tracking light path unit is used for tracking and positioning an unmanned aerial vehicle based on an unmanned aerial vehicle tracking light path; and the control and processing unit is used for collecting an original spectrum of the first light source light and a remote sensing spectrum of the remote sensing light and performing imaging analysis and processing on the multi-component atmospheric trace constituents, and is also used for adjusting and controlling the tracking light path based on tracking and positioning information. The following is a detailed description of each unit.

Figure 2:
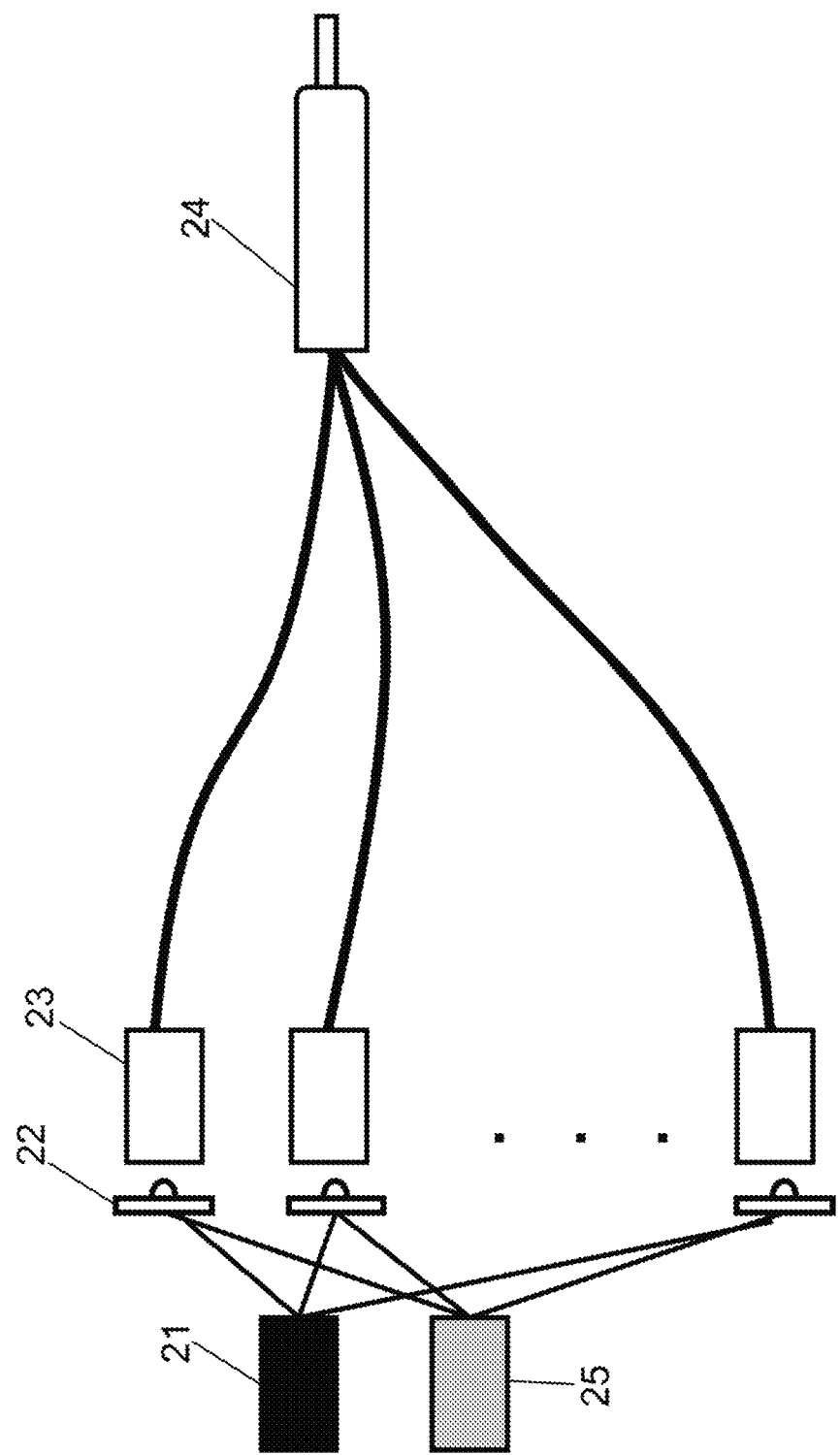
FIG. 2 is a structural schematic diagram of a light source unit provided by an embodiment.

As shown in FIG. 2, the light source unit includes a constant current power supply 21, a plurality of first light sources 22 with different wavelength ranges, couplers 23 corresponding to the light sources one to one, and a one-into-many optical fiber 24. The purpose of this light source unit is to obtain a broadband spectrum light source with high light intensity and good stability for hyper-spectral remote sensing measurement. First, after the first light sources 22 with different wavelength ranges are connected to the constant current power supply 21, first light source light beams with higher intensity and wider spectrum are emitted based on electric energy provided by the constant current power supply, and then the first light source light beams with different wavelengths are respectively coupled into a receiving end of a one-into-many optical fiber 24 through couplers 23 with set focal lengths on their optical axes. Here, it is necessary to ensure that an incident angle of light after the first light source light is coupled is consistent with a receiving angle of the receiving end of the one-into-many optical fiber 24. For example, if the receiving angle of the one-into-many optical fiber 24 is at most 30°, it is necessary to ensure that a convergence angle of the incident light is less than or equal to 30°, so as to ensure a 10% light energy utilization rate. The first light source light of all the first light sources is transmitted through the one-into-many optical fiber 24 and outputted from an emergent end of the one-into-many optical fiber.

To achieve night hyper-spectral remote sensing imaging, the wavelength range of the first light source 22 is 200 nm-2000 nm. The emergent light by the first light source in this wavelength range can meet the requirements of 24-hour hyper-spectral remote sensing imaging all day.

In order to ensure the stability of the spectrum of the light source, the light source unit 1 further includes a temperature control platform 25. The temperature control platform performs constant temperature control on the plurality of first light sources with different wavelength ranges in combination with a PID algorithm, so that temperature fluctuation ranges of the first light sources are controlled within +/−0.1° C., thus ensuring the spectrum stability in hyper-spectral remote sensing measurement. The couplers can adopt quartz globe lenses. In order to support the quartz globe lenses, the light source unit 1 further includes optical brackets (not shown in FIG. 2) for supporting the quartz globe lenses.

Figure 3:
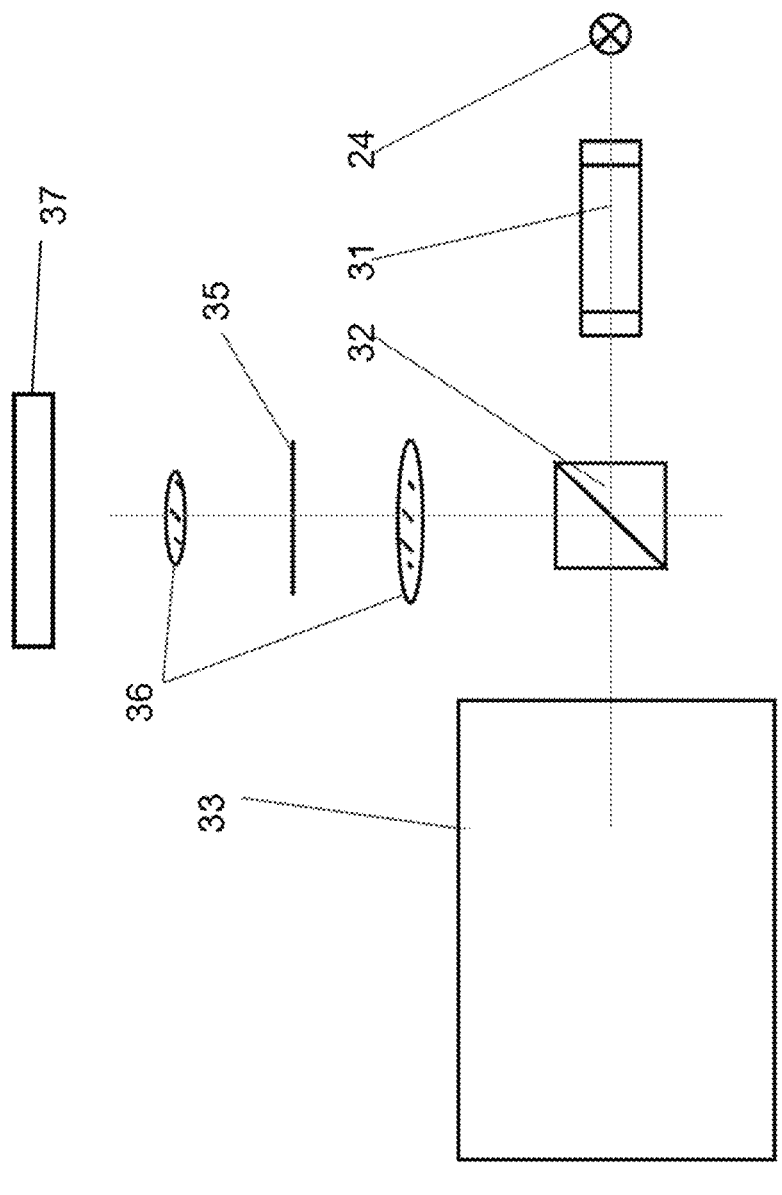
FIG. 3 is a structural schematic diagram of a detection light path unit and an unmanned aerial vehicle tracking light path unit provided by an embodiment.
Figure 3:
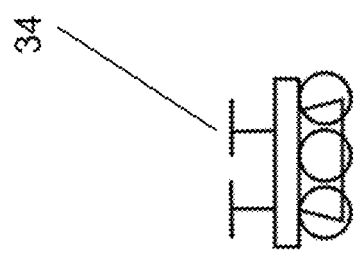

As shown in FIG. 3, the detection light path unit 2 includes an emergent coupling lens 31, a Semi-transparent and semi-reflective prism 32, and a collimating telescope subsystem 33. The purpose of the detection light path unit is to ensure that the light intensity in a measurement light path is sufficient, and no energy divergence of the measurement light beam is caused by the problem of light beam shaping, further meeting a signal-to-noise ratio of hyper-spectral remote sensing measurement. The first light source light emitted by the light source unit 1 (i.e., the first light source light outputted by the emergent end of the one-into-many optical fiber 24) passes through the emergent coupling lens 31, the Semi-transparent and semi-reflective prism 32, and the collimating telescope subsystem 33 sequentially to be collimated, and a collimated light beam is irradiated on a corner reflector in the unmanned aerial vehicle tracking light path unit to form an emergent light path for gas measurement. The unmanned aerial vehicle also carries the corner reflector, emergent light of the detection light path unit, after being transmitted in a measurement area, carries information of the multi-component atmospheric trace constituents and is received and then reflected by the corner reflector, reflected light is received by the collimating telescope subsystem 33, and then passes through the Semi-transparent and semi-reflective prism 32, the emergent coupling lens 31 and the output end of the one-into-many optical fiber 24 sequentially to form a collection light path for gas measurement.

After the first light source light outputted by the emergent end of the one-into-many optical fiber 24 passes through the emergent coupling lens 31, a light beam which originally has a great divergence angle is beam-shaped, and the light beam becomes a light beam with a smaller divergence angle after a distance from the one-into-many optical fiber 24 to the emergent coupling lens 31 is adjusted, and then the light beam with the smaller divergence angle is emitted into the collimating telescope subsystem 33, so that emergent light with higher parallelism can be obtained. In the embodiment, the detection light path unit further includes an optical fiber clamping and focusing mechanism (not shown in FIG. 2), and the optical fiber clamping and focusing mechanism is controlled to adjust a distance from the output end of the one-into-many optical fiber 24 to the emergent coupling lens 31.

Whether the parallelism of the emergent light of the collimating telescope subsystem 33 is good or not has great relations with the surface precision of the emergent coupling lens 31 and the position of the emergent end of the one-into-many optical fiber. In order to ensure good collimation of light, the surface precision of the emergent coupling lens is preferably less than a quarter of the wavelength. In order to ensure the utilization efficiency of light energy, the divergence angle of the emergent light at the emergent end of the one-into-many optical fiber 24 after passing through the emergent coupling lens 31 should be less than 30°, and the distance between the emergent coupling lens 31 and the first reflector at the incident end of the collimating telescope subsystem should be restricted to be located at the focus of the first reflector. Under the condition that parameters of the emergent coupling lens 31 and the collimating telescope subsystem 33 are fixed, the position of the emergent end of the one-into-many optical fiber 24 is determined with a purpose of ensuring that an optical fiber emission angle passing through the emergent coupling lens is less than 30°. In this way, the position of the emergent end of the one-into-many optical fiber 24 and the position of the above-mentioned part are determined and unique.

The Semi-transparent and semi-reflective prism 32 is used to make the unmanned aerial vehicle tracking light path coaxial with the detection light path, thus avoiding measurement errors. Here, the assembly perpendicularity of an incident plane and an optical axis of the Semi-transparent and semi-reflective prism 32 is preferably less than 0.05°.

As shown in FIG. 3, the unmanned aerial vehicle tracking light path unit 3 includes an unmanned aerial vehicle 34 carrying a corner reflector and two second light sources, a reticle 35, an eyepiece 36, and a CCD detector 37. The purpose of the unmanned aerial vehicle tracking light path unit 3 is to ensure the image continuity during hyper-spectral remote sensing imaging. Emergent light of the second light sources on the unmanned aerial vehicle 34 is received by the collimating telescope subsystem 33 and irradiated on the Semi-transparent and semi-reflective prism 32, and an included angle between the Semi-transparent and semi-reflective prism 32 and incident light is 45°, after being reflected by the Semi-transparent and semi-reflective prism 32, the incident light is emitted to the CCD detector 37 through the reticle 35 and eyepiece 36, the CCD detector 37 detects positions of two second light source imaging points on the reticle 35 to form the unmanned aerial vehicle tracking light path, the unmanned aerial vehicle tracking light path is coaxial with a detection light path through the Semi-transparent and semi-reflective prism 32.

The CCD detector 37 generates a deviation correcting signal when the two second light source imaging points move. Imaging on the CCD detector 37 should meet a certain resolution, which is embodied in that when the unmanned aerial vehicle 34 moves by a certain distance in a real world, an image of the unmanned aerial vehicle 34 should have a certain amount of pixel position change on the CCD detector 37. When the image of the unmanned aerial vehicle 34 is located at a specific position of the CCD detector 37, it is necessary to ensure that the light intensity received by the detection light path is stable and sufficient. A position of the unmanned aerial vehicle 34 in a field of view and a deviation from a preset position can be judged through specific coordinates of the image of the unmanned aerial vehicle 34 at the position of the CCD detector 37.

As shown in FIG. 1, the control and processing unit 4 includes a first spectrometer 41, a second spectrometer 42 with a processing function, and a rotating platform 43. The control and processing unit 4 is used for controlling and adjusting a situation in which the detection light path aims at the unmanned aerial vehicle, so as to ensure that the robustness of observation imaging meets the requirements. The first spectrometer 41 is used for emitting the original spectrum of the first light source light by adopting the light source unit 1 and transmitting the original spectrum to the second spectrometer 42, the second spectrometer 42 collects the remote sensing spectrum from the output end of the one-into-many optical fiber 24 in the collection light path, and performs analysis and processing on the multi-component atmospheric trace constituents based on the original spectrum and the remote sensing spectrum, and also acquires the deviation correcting signal from the CCD detector 37, and controls the rotating platform 43 to drive the collimating telescope subsystem based on the deviation correcting signal and in combination with the PID control algorithm, so that the unmanned aerial vehicle moves to a center of an observation field of view again, and then the detection light path achieves continuous and normal observation.

Specifically, the unmanned aerial vehicle 34 is adjusted to a center of a field of view of a telescope, so that the detection light path can observe normally; at this time, the positions of the images formed by the two second light sources carried by the unmanned aerial vehicle 34 on the reticle 35 are determined, positions between two image spots are determined, when the unmanned aerial vehicle 34 moves, the positions of the images of the two second light sources in the CCD detector 37 on the reticle will move, thus generating a deviation correcting signal that requires the telescope to follow the movement of the unmanned aerial vehicle 34; according to the deviation correcting signal of the movement of the unmanned aerial vehicle, in combination with the PID control algorithm, the rotating platform 43 is controlled to rotate at a corresponding angle to make the unmanned aerial vehicle return to the center of the observation field of view again, and then the detection light path can continue to observe normally. In order to ensure the continuity of observation of the detection light path, it is required that the precision of the rotating platform is preferably less than 0.01°, the repeated positioning precision is preferably less than 0.05°, and the response time of a whole angle adjustment system is preferably less than 2 ms.

The CCD detector 37 also generates a linear distance variation signal of a linear distance between the unmanned aerial vehicle and the collimating telescope subsystem when the two second light source imaging points move, and specifically determines a linear distance variation of a linear distance between the unmanned aerial vehicle and the telescope according to the position of the image spot between the two second light sources, and the second spectrometer 42 updates a real-time distance between the unmanned aerial vehicle and the collimating telescope subsystem according to the linear distance variation signal.

Figure 4:
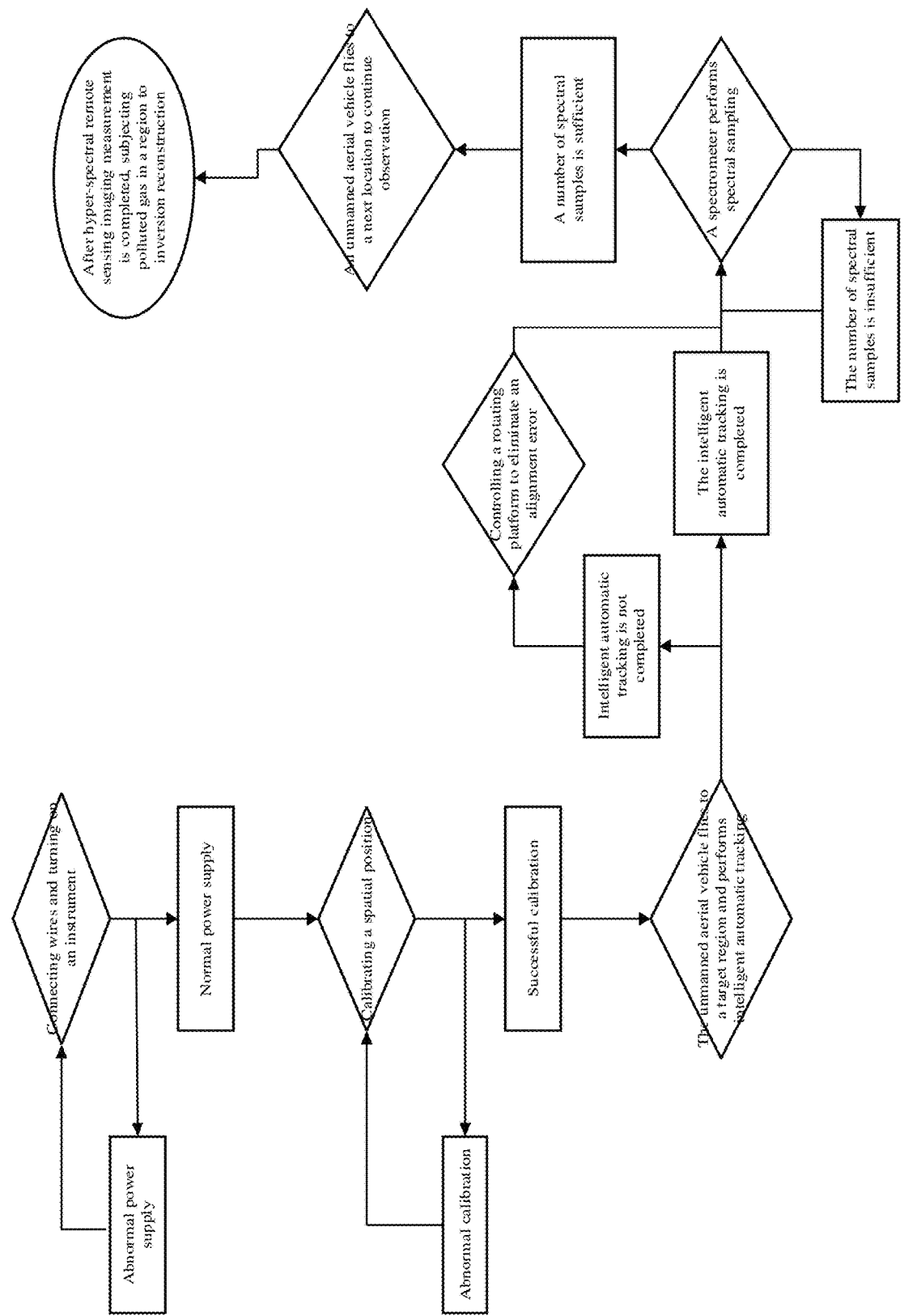
FIG. 4 is a diagram of a hyper-spectral remote sensing imaging process provided by an embodiment.

As shown in FIG. 4, a hyper-spectral remote sensing imaging process implemented by the night hyper-spectral remote sensing imaging system includes the following steps.

Step 1: calibration, where a device with a corner reflector and a second light source is calibrated at a position about 500 meters away from an observation point, to ensure that the detection light path and the unmanned aerial vehicle tracking light path are coaxial, that is, to determine and record positions P and Q of the second light source in the field of view when the light paths are coaxial.

Step 2: after the calibrated device is firmly connected to the unmanned aerial vehicle 34 through a specific connection mechanism, the unmanned aerial vehicle 34 takes off, after the unmanned aerial vehicle 34 flies to an area to be measured, the telescope roughly aims at the unmanned aerial vehicle 34, then an intelligent automatic tracking program runs after an image of the unmanned aerial vehicle 34 is presented on the CCD detector 37, at this time the unmanned aerial vehicle 34 can be locked in the center of the field of view by the telescope without a large offset. Meanwhile, a position of the point P in the field of view and a distance between the point P and the point Q (as shown in FIG. 4) are detected, so that a linear distance between the unmanned aerial vehicle 34 and an observer can be calculated.

Step 3: the first light source 22 with temperature control, the first spectrometer 42 and the second spectrometer 43 are turned on, the first light source light emitted by the first light source 22 passes through the coupler 23 and is emitted to the receiving end of the one-into-many optical fiber 24, meanwhile the emergent end of the one-into-many optical fiber 24 emits light with a certain divergence angle, after the light passes through the emergent coupling lens 31, divergent light at a specific angle is obtained and then passes through the Semi-transparent and semi-reflective prism 32 and reaches the collimating telescope subsystem 33 to be emitted and aligned with the corner reflector carried by the unmanned aerial vehicle 34. The emergent light, after being transmitted in a measurement area, carries information of the multi-component atmospheric trace constituents, and is received and then reflected by the corner reflector to form a detection signal, the detection signal, after being received by the collimating telescope subsystem 33, passes through the Semi-transparent and semi-reflective prism 32, the emergent coupling lens 31 and the output end of the one-into-many optical fiber 24 sequentially, and is collected by the connected second spectrometer 43 to obtain a remote sensing spectrum, so that the measurement can be started. After the measurement for a certain time, a background spectrum and a light source spectrum are collected according to the needs of inversion.

Figure 5:
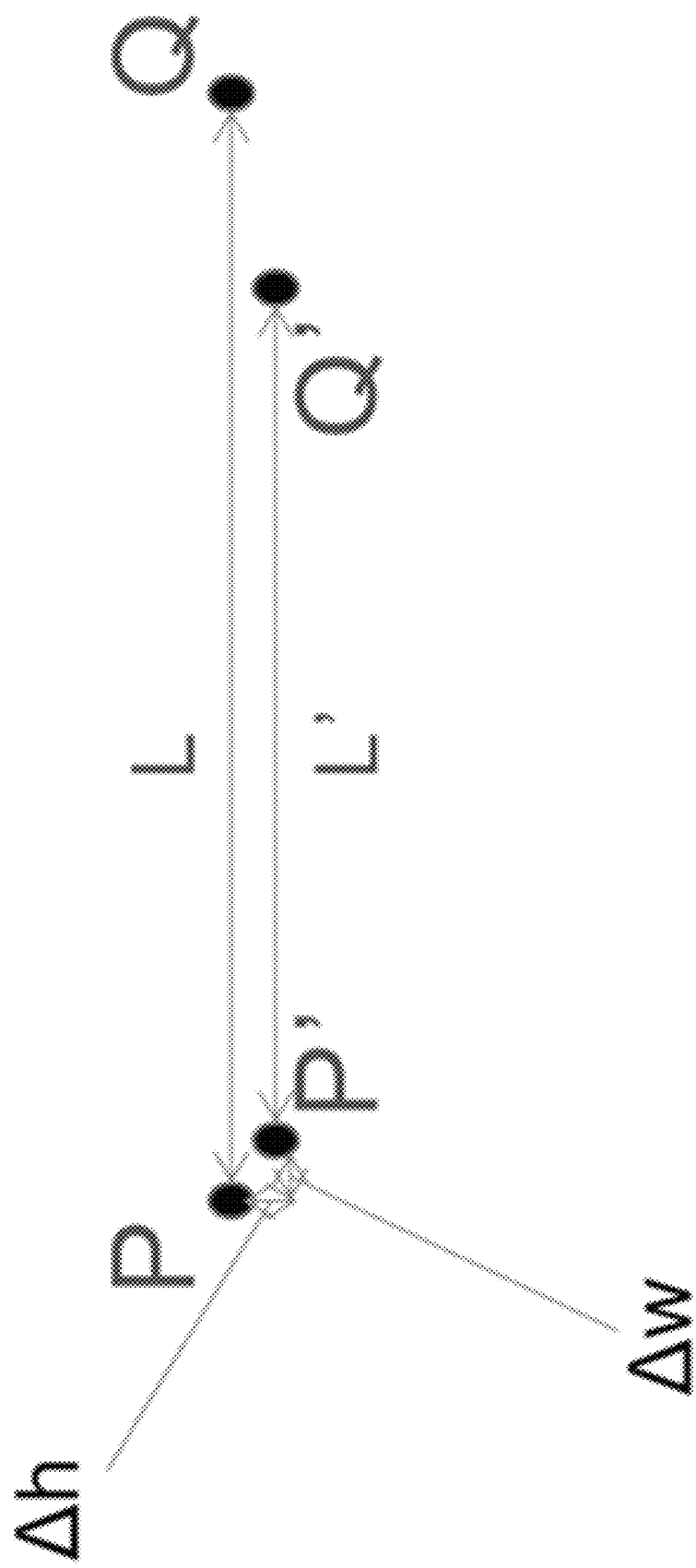
FIG. 5 is a schematic diagram of deviation imaging provided by an embodiment.

Step 4: when the unmanned aerial vehicle 34 are offset, the CCD detector 37 will generate a deviation amount feedback signal. As shown in FIG. 5, after the positions of the two second light sources are offset in a detection field of view, the positions of the point P and the point Q will change to a point P' and a point Q' correspondingly, and corresponding horizontal offsets $\Delta w$ and $\Delta h$ will be calculated according to a horizontal distance and a longitudinal distance between P and P', and the program controls the rotating platform 41 to correct the corresponding angles according to $\Delta w$ and $\Delta h$, so that the unmanned aerial vehicle 34 returns to the center of the field of view again, and the observation process is stably operated. The CCD detector 37 also measures that the distance L between P and Q moves to the distance L' between P and Q', and calculates the distance variation according to L and L', and based on the distance variation, the linear distance variation signal of the linear distance between the unmanned aerial vehicle and the collimating telescope subsystem can be updated.

Step 5: the unmanned aerial vehicle 34 flies along a selected route, and, in cooperation with intelligent automatic tracking and automatic measurement programs, collects spectral data with high time resolution and high spatial resolution in a detected target area, and after inversion of the data, concentration information and spatial distribution information of pollutants in the observed area can be reconstructed.

Application Example

Figure 6:
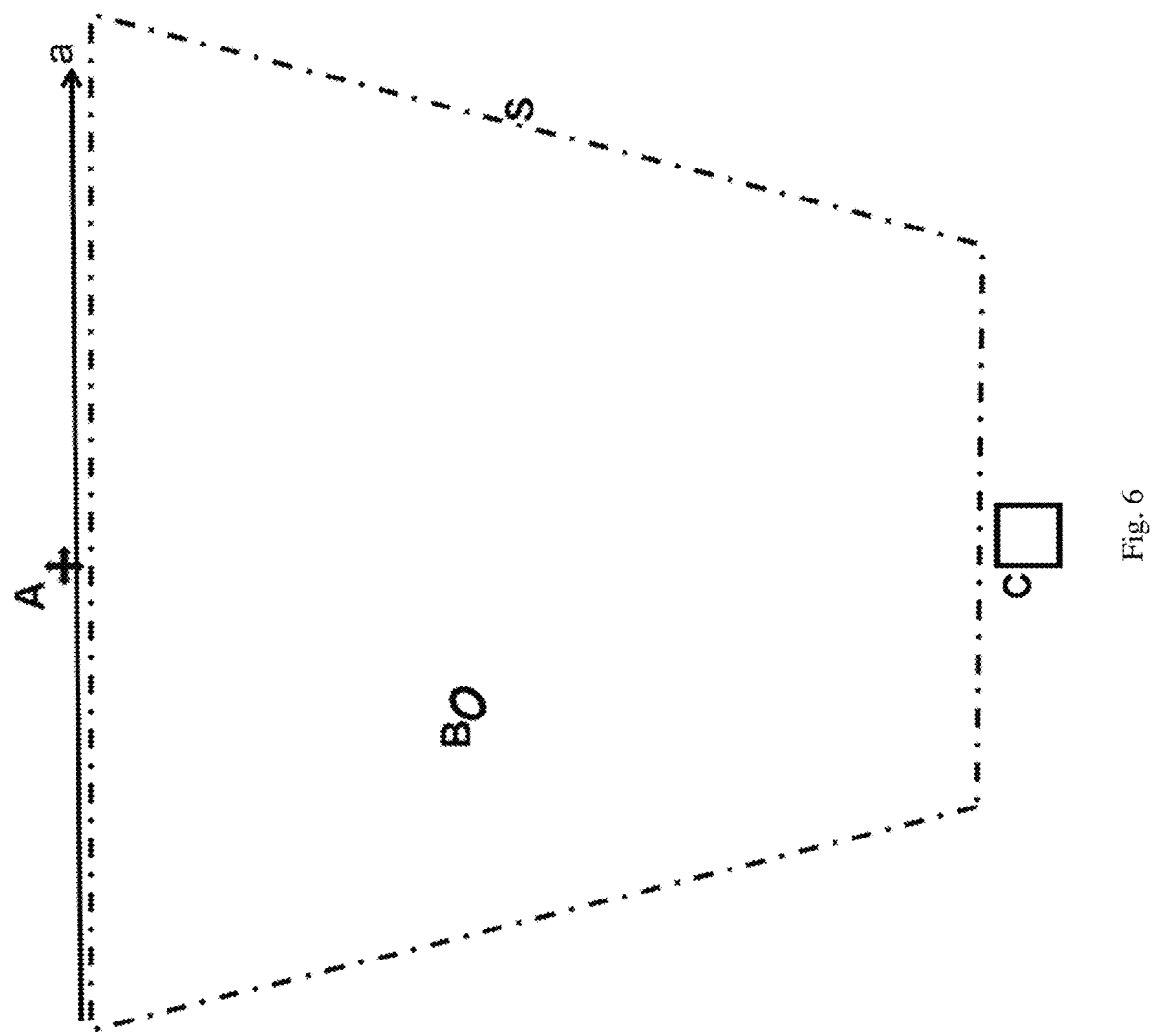
FIG. 6 is a schematic diagram of example measurement provided by an embodiment.
Figure 7:
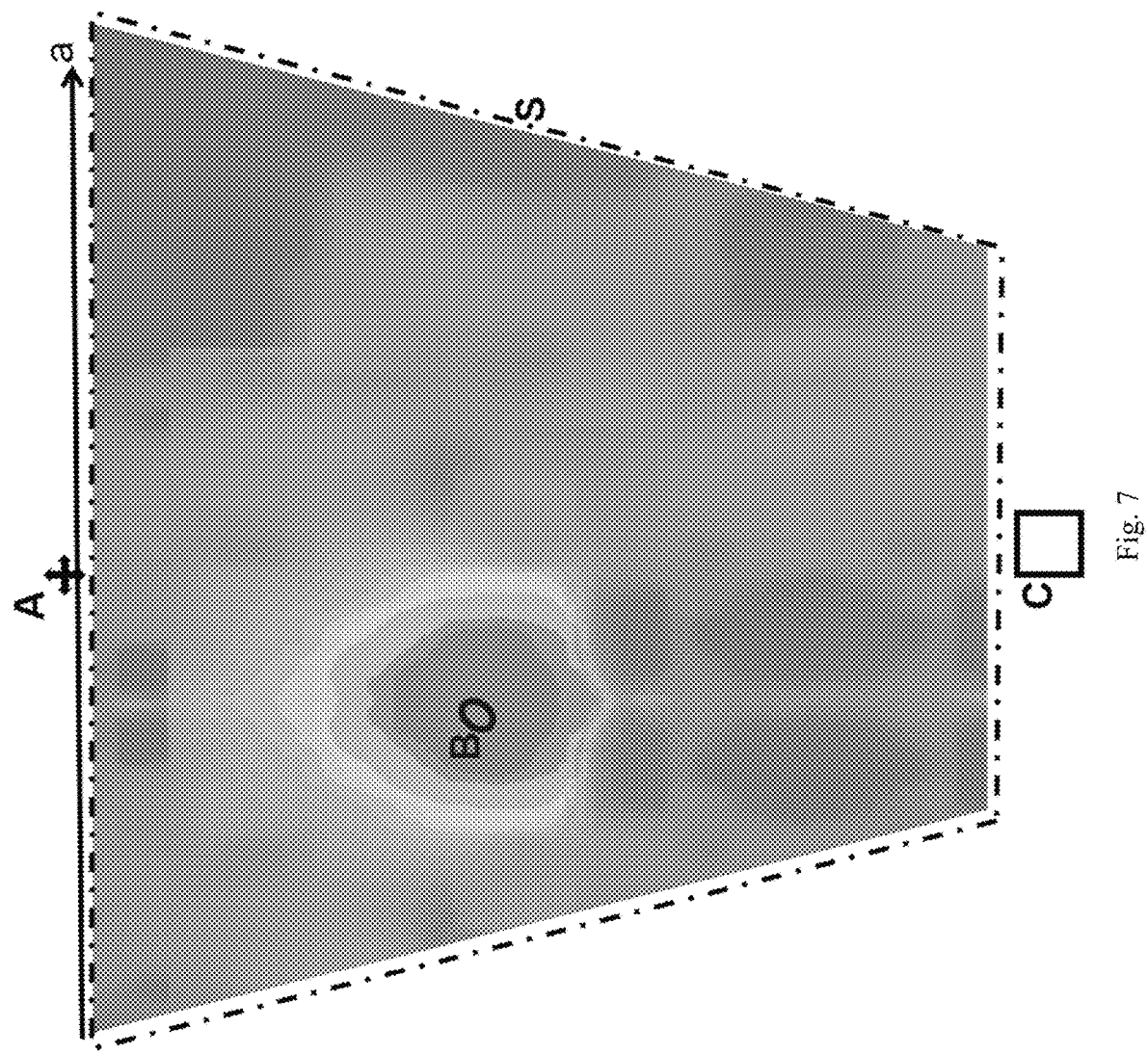
FIG. 7 is an example measurement result provided by an embodiment.

On the evening of Mar. 8, 2023, the device of this invention carried out an actual measurement experiment in a certain place. The specific experimental information is as follows. As shown in FIG. 6, the observation device was placed at a point C, and standard nitrogen dioxide gas was placed at a point B, about 300 meters away from the point C. The unmanned aerial vehicle carrying an artificial light source and a corner reflector was located at a position A, about 600 meters away from the point C. In the experiment, the standard nitrogen dioxide gas was released, and the unmanned aerial vehicle flied along a path A for detection. After one cycle of flight, a pollutant concentration spectrum in an area S was obtained, and a pollutant gas distribution situation in the area S was constructed after inversion by the algorithm, as shown in FIG. 7.

The technical solutions and beneficial effects of the present invention have been described in detail in the foregoing detailed description, and it should be understood that the above description is only the most preferred embodiment of the present invention, and is not intended to limit the present invention, and any modifications, additions, and equivalents made within the scope of the principles of the present invention should be included in the protection scope of the present invention.

What is claimed is:

1. A night hyper-spectral remote sensing imaging system for multi-component atmospheric trace constituents, comprising a light source unit, a detection light path unit, an unmanned aerial vehicle tracking light path unit, and a control and processing unit, wherein the light source unit is configured for coupling and then outputting first light source light of a plurality of first light sources with different wavelength ranges capable of imaging at night, wherein the light source unit comprises a constant current power supply, the plurality of first light sources with different wavelength ranges, a plurality of couplers corresponding to each of the plurality of first light sources, and a one-into-many optical fiber; and each first light source emits the first light source light based on electrical energy provided by the constant current power supply, and the first light source light is coupled to a receiving end of the one-into-many optical fiber through the corresponding coupler, and the first light source light of all the first light sources is transmitted through the one-into-many optical fiber and outputted from an emergent end of the one-into-many optical fiber;

the detection light path unit is configured for collimating and then outputting the first light source light emitted by the light source unit, and receiving remote sensing light fed back based on the first light source light, wherein the detection light path unit comprises an emergent coupling lens, a semi-transparent and semi-reflective prism, and a collimating telescope subsystem, the first light source light emitted by the light source unit passes through the emergent coupling lens, the semi-transparent and semi-reflective prism and the collimating telescope subsystem sequentially to be collimated, and a collimated light beam is irradiated on a corner reflector in the unmanned aerial vehicle tracking light path unit to form an emergent light path for gas measurement, wherein the surface precision of the emergent coupling lens is less than a quarter of a wavelength based on 200 nm, and the emergent coupling lens is located at a focus of a first reflector at a distance from the first reflector at an incident end of the collimating telescope subsystem, to determine a position of an emergent end of the one-into-many optical fiber so that an optical fiber emission angle passing through the emergent coupling lens is less than 30°;

wherein an unmanned aerial vehicle also carries the corner reflector, wherein emergent light of the detection light path unit, after being transmitted in a measurement area, carries information of the multi-component atmospheric trace constituents and is received and then reflected by the corner reflector, reflected light is received by the collimating telescope subsystem, and then passes through the semi-transparent and semi-reflective prism, the emergent coupling lens and the output end of the one-into-many optical fiber sequentially to form a collection light path for gas measurement;

the unmanned aerial vehicle tracking light path unit is configured for tracking and positioning the unmanned aerial vehicle based on the unmanned aerial vehicle tracking light path, wherein the unmanned aerial vehicle tracking light path unit comprises the unmanned aerial vehicle carrying two second light sources, a reticle, an eyepiece, and a charge coupled device (CCD) detector; and emergent light of the second light sources is received by the collimating telescope subsystem and irradiated on the semi-transparent and semi-reflective prism, after being reflected by the semi-transparent and semi-reflective prism, the incident light is emitted to the CCD detector through the reticle and the eyepiece, the CCD detector detects positions of two second light source imaging points on the reticle to form the unmanned aerial vehicle tracking light path, the unmanned aerial vehicle tracking light path is coaxial with a detection light path through the semi-transparent and semi-reflective prism, and the CCD detector generates a deviation correcting signal when the two second light source imaging points move; and the control and processing unit is configured for collecting an original spectrum of the first light source light and a remote sensing spectrum of the remote sensing light and performing imaging analysis and processing on the multi-component atmospheric trace constituents, and is also configured for adjusting and controlling the unmanned aerial vehicle tracking light path based on tracking and positioning information.

2. The night hyper-spectral remote sensing imaging system for multi-component atmospheric trace constituents according to claim 1, wherein the light source unit further comprises a temperature control platform, and the temperature control platform performs constant temperature control on the plurality of first light sources with different wavelength ranges in combination with a proportional-integral-derivative (PID) algorithm, so that temperature fluctuation ranges of the first light sources are controlled within +/−0.1° C.

3. The night hyper-spectral remote sensing imaging system for multi-component atmospheric trace constituents according to claim 1, wherein the light source unit further comprises optical brackets for supporting the couplers, and the couplers adopt quartz globe lenses.

4. The night hyper-spectral remote sensing imaging system for multi-component atmospheric trace constituents according to claim 1, wherein the detection light path unit further comprises an optical fiber clamping and focusing mechanism, and the optical fiber clamping and focusing mechanism is controlled to adjust a distance from an output end of the one-into-many optical fiber to the emergent coupling lens.

5. The night hyper-spectral remote sensing imaging system for multi-component atmospheric trace constituents according to claim 1, wherein an included angle between the semi-transparent and semi-reflective prism and incident light is 45°.

6. The night hyper-spectral remote sensing imaging system for multi-component atmospheric trace constituents according to claim 1, wherein the control and processing unit comprises a first spectrometer, a second spectrometer with a processing function, and a rotating platform; and the first spectrometer is configured for emitting the original spectrum of the first light source light by adopting the light source unit and transmitting the original spectrum to the second spectrometer, the second spectrometer collects the remote sensing spectrum from the output end of the one-into-many optical fiber in the collection light path, and performs analysis and processing on the multi-component atmospheric trace constituents based on the original spectrum and the remote sensing spectrum, and also acquires the deviation correcting signal from the CCD detector, and controls the rotating platform to drive the collimating telescope subsystem based on the deviation correcting signal and in combination with a PID control algorithm, so that the unmanned aerial vehicle moves to a center of an observation field of view again, and then the detection light path achieves continuous and normal observation.

7. The night hyper-spectral remote sensing imaging system for multi-component atmospheric trace constituents according to claim 6, wherein the CCD detector also generates a linear distance variation signal of a linear distance between the unmanned aerial vehicle and the collimating telescope subsystem when the two second light source imaging points move, and the second spectrometer updates a real-time distance between the unmanned aerial vehicle and the collimating telescope subsystem according to the linear distance variation signal.

* * * * *